(12) United States Patent
Muramatsu

(10) Patent No.: US 11,414,148 B2
(45) Date of Patent: Aug. 16, 2022

(54) STRADDLED VEHICLE

(71) Applicant: YAMAHA HATSUDOKI KABUSHIKI KAISHA, Iwata (JP)

(72) Inventor: Kenichi Muramatsu, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 159 days.

(21) Appl. No.: 16/988,147

(22) Filed: Aug. 7, 2020

(65) Prior Publication Data

US 2021/0053638 A1 Feb. 25, 2021

(30) Foreign Application Priority Data

Aug. 23, 2019 (JP) .............................. JP2019-153048

(51) Int. Cl.
*B62J 6/027* (2020.01)
*B62J 6/029* (2020.01)

(52) U.S. Cl.
CPC ............... *B62J 6/027* (2020.02); *B62J 6/029* (2020.02)

(58) Field of Classification Search
CPC .................................... B62J 6/027; B62J 6/29
See application file for complete search history.

(56) References Cited

U.S. PATENT DOCUMENTS

| 2009/0141510 | A1* | 6/2009 | Hayakawa | ................. B62J 6/02 362/475 |
| 2014/0313762 | A1 | 10/2014 | Owada | |
| 2015/0124467 | A1 | 5/2015 | Kuriki | |

FOREIGN PATENT DOCUMENTS

| JP | 2013067339 A | 4/2013 |
| JP | 2014184786 A | 10/2014 |

* cited by examiner

*Primary Examiner* — Thomas M Sember
(74) *Attorney, Agent, or Firm* — Rabin & Berdo, P.C.

(57) ABSTRACT

A straddle vehicle includes a front fork unit provided to be inclined rearwardly, a front cover provided forwardly of the front fork unit, and having a rear cover member, and a front cover member separately provided from the front cover member and positioned forwardly of the rear cover member, a headlamp provided at the front cover, a holder attached to the rear cover member and holds the headlamp, and a driver that drives the headlamp. The driver stored in the front cover such that the driver is located at a position farther upward than the headlamp, farther rearward than a first virtual line extending in a up-and-down direction through a rear end of the headlamp in a front-to-rear direction of the vehicle, and farther rearward than a second virtual line extending in parallel with an axis of the front fork unit in the side view of the vehicle.

8 Claims, 8 Drawing Sheets

STRADDLED VEHICLE

CROSS-REFERENCE TO RELATED APPLICATIONS

This application is based upon and claims the benefit of priority of the prior Japanese Patent Application No. 2019-153048, filed on Aug. 23, 2019, the entire contents of which are incorporated herein by reference.

BACKGROUND OF THE INVENTION

Field of the Invention

The present invention relates to a straddled vehicle including a headlamp.

Description of Related Art

In a straddled vehicle such as a motorcycle, a headlamp (headlight) and a drive unit that drives the headlamp are provided in a front part of the vehicle, for example. In a lighting device of the motorcycle described in JP 2014-184786 A, a driver (drive unit) for driving light emitters is arranged between the pair of left and right light emitters (headlamps).

Specifically, the lighting device described in JP 2014-184786 A has a housing in addition to the left and right light emitters and the driver. The housing has a rear wall surface that covers the left and right light emitters from behind and supports the left and right light emitters from behind.

The right part of the rear wall surface covers the right light emitter from behind, and the left part of the rear wall surface covers the left light emitter from behind. A concave portion is formed at the center portion of the rear wall surface in a left-and-right direction to be located between the left and right light emitters. The driver is attached to the concave portion.

BRIEF SUMMARY OF THE INVENTION

In the above-mentioned lighting device, when the left and right light emitters emit light, the heat generated from the left and right light emitters is removed by a heat sink in the housing. However, the heat that is not completely removed by the heat sink may be transmitted to the housing depending on a light-emitting state of the left and right light emitters. In this case, the heat transmitted to the housing is further transmitted to the driver. The transmission of heat from the light emitters to the driver shortens the life of the driver.

In order to suppress the transmission of heat from the light emitters to the driver, the configuration in which the driver is attached to the vehicle body separately from the light emitters and the housing is considered. In this case, it is necessary to ensure the installation space for the driver in the front part of the vehicle separately from the installation space for the light emitters and the housing. Therefore, the size of the front part of the vehicle may be increased.

An object of the present invention is to provide a straddled vehicle in which heat transmitted to a driver is reduced while an increase in size of a front part of the vehicle is suppressed.

(1) A straddled vehicle according to one aspect of the present invention includes a front fork unit that is inclined rearwardly, a front cover that is provided forwardly of the front fork unit, a headlamp that includes a light-emitting diode and is provided at the front cover to emit light generated by the light-emitting diode, a holder that holds the headlamp and is provided at the front cover, and a driver that drives the headlamp, wherein the front cover has a rear cover member that is attached to the front fork unit at a position farther forward than the front fork unit, and a front cover member that is provided forwardly of the rear cover member and separately from the rear cover member, the holder is attached to the rear cover member, and the driver is stored in the front cover such that at least part of the driver is located at a position farther upward than the headlamp, is stored in the front cover such that at least part of the driver is located at a position farther rearward than a first virtual line extending in an up-and-down direction through a rear end of the headlamp in a front-to-rear direction vehicle (hereinafter, also referred to as "a side view") of the and is stored in the front cover such that the driver is located at a position farther rearward than a second virtual line extending along an axis of the front fork unit in the side view of the vehicle.

In the straddled vehicle, the rear cover member is attached to the front fork unit at a position farther forward than the front fork unit. The headlamp is held by the holder. In this state, the holder is attached to the rear cover member. The driver is stored in the front cover.

In the front cover, at least part of the driver is located at a position farther upward than the headlamp. Further, at least part of the driver is located at a position farther rearward than the first virtual line in the side view of the vehicle. Further, at least part of the driver is located at a position farther rearward than the second virtual line in the side view of the vehicle.

The front fork unit is inclined with respect to a vertical axis and extends rearwardly and upwardly. In the front part of the vehicle, the space located at a position farther rearward than the first virtual line, farther rearward than the second virtual line and farther upward than the front fork is a dead space.

With the above-mentioned configuration, at least part of the driver is located in the dead space in the front part of the vehicle. In this manner, the dead space in the front part of the vehicle is effectively utilized as an installation space for the drive unit. Thus, even in a case where the driver is arranged to be spaced apart from the headlamp by a predetermined distance, an increase in size of the front part of the vehicle due to ensuring an installation space for the driver is suppressed.

As a result, it is possible to reduce the heat transmitted to the driver while suppressing an increase in size of the front part of the vehicle.

(2) The driver may rectify an electric current supplied to the light-emitting diode.

In this case, the electric current supplied to the light-emitting diode is rectified, so that the light-emitting state of the light-emitting diode is stabilized.

(3) The straddled vehicle may further include a plurality of harnesses that include at least two harnesses respectively connected to the headlamp and the driver, and a connector for connecting at least part of the plurality of harnesses to another harness, wherein the at least part of the plurality of harnesses and the connector may be stored in the front cover.

In this case, because at least part of the plurality of harnesses and the connector are not exposed to the outside of the vehicle, vandalism of the plurality of harnesses and the connector by vandals is prevented. Further, at least part of the plurality of harnesses and the connector are protected from rainwater, dust and so on.

(4) The headlamp and the driver may be provided to be located at a center of the vehicle in a left-and-right direction in a front view of the vehicle.

In this case, because the headlamp is arranged at the center of the vehicle in the left-and-right direction, it is possible to improve flexibility in layout of vehicle components in the front part of the vehicle while suppressing an increase in size of the front part of the vehicle in the left-and-right direction.

(5) The straddled vehicle may further include a meter that displays at least a travelling speed of the vehicle, wherein the rear cover member may support the meter at the front fork unit such that the meter is located at a position farther upward than the headlamp, and may support the meter at the front fork unit such that at least part of the meter is located at a position farther rearward than the first virtual line in the side view of the vehicle.

In this case, at least part of the meter is arranged in a dead space located at a position farther rearward and upward than the headlamp in the side view of the vehicle.

In this manner, the dead space in the front part of the vehicle is effectively utilized as an installation space for the meter. Therefore, an increase in size of the front part of the vehicle can be suppressed.

(6) The second virtual line may extend through a front end of the headlamp and a front end of the meter in the side view of the vehicle.

In this case, because at least part of the driver is located at a position farther rearward than the second virtual line, an increase in size of the structure of the front part of the vehicle at a position farther upward and forward than the headlamp is suppressed.

(7) The second virtual line may extend in parallel with the axis of the front fork unit through a front end of the headlamp in the side view of the vehicle.

In this case, because at least part of the driver is located at a position farther rearward than the second virtual line, an increase in size of the structure of the front part of the vehicle at a position farther upward and forward than the headlamp is suppressed.

(8) The headlamp may further include an optical system that the light emitted by the light-emitting diode forwardly of the vehicle, and the holder may include an optical system operating element for adjusting a traveling direction of light that is led forwardly of the vehicle from the light-emitting diode by changing a position or an orientation of the optical system.

In this case, the traveling direction of the light emitted from the headlamp is easily adjustable.

(9) At least part of the holder may be formed of resin.

In this case, because at least part of the holder is formed of resin, the heat transmitted from the headlamp to the front cover can be reduced as compared to the case where the entire holder is formed of metal. Therefore, the heat transmitted from the headlamp to the driver via the holder and the front cover can be reduced.

(10) The driver may be stored in the front cover to be located at a position farther upward than the headlamp.

In this case, flexibility in layout of the driver in the front part of the vehicle is improved, and flexibility in design of the front part of the vehicle is improved.

Other features, elements, characteristics, and advantages of the present invention will become more apparent from the following description of preferred embodiments of the present invention with reference to the attached drawings.

DESCRIPTION OF THE PREFERRED EMBODIMENTS

A straddled vehicle according to one embodiment of the present invention will be described below with reference to the drawings. A motorcycle will be explained as one example of the straddled vehicle.

[1] Schematic Configuration of Motorcycle

Figure 1:
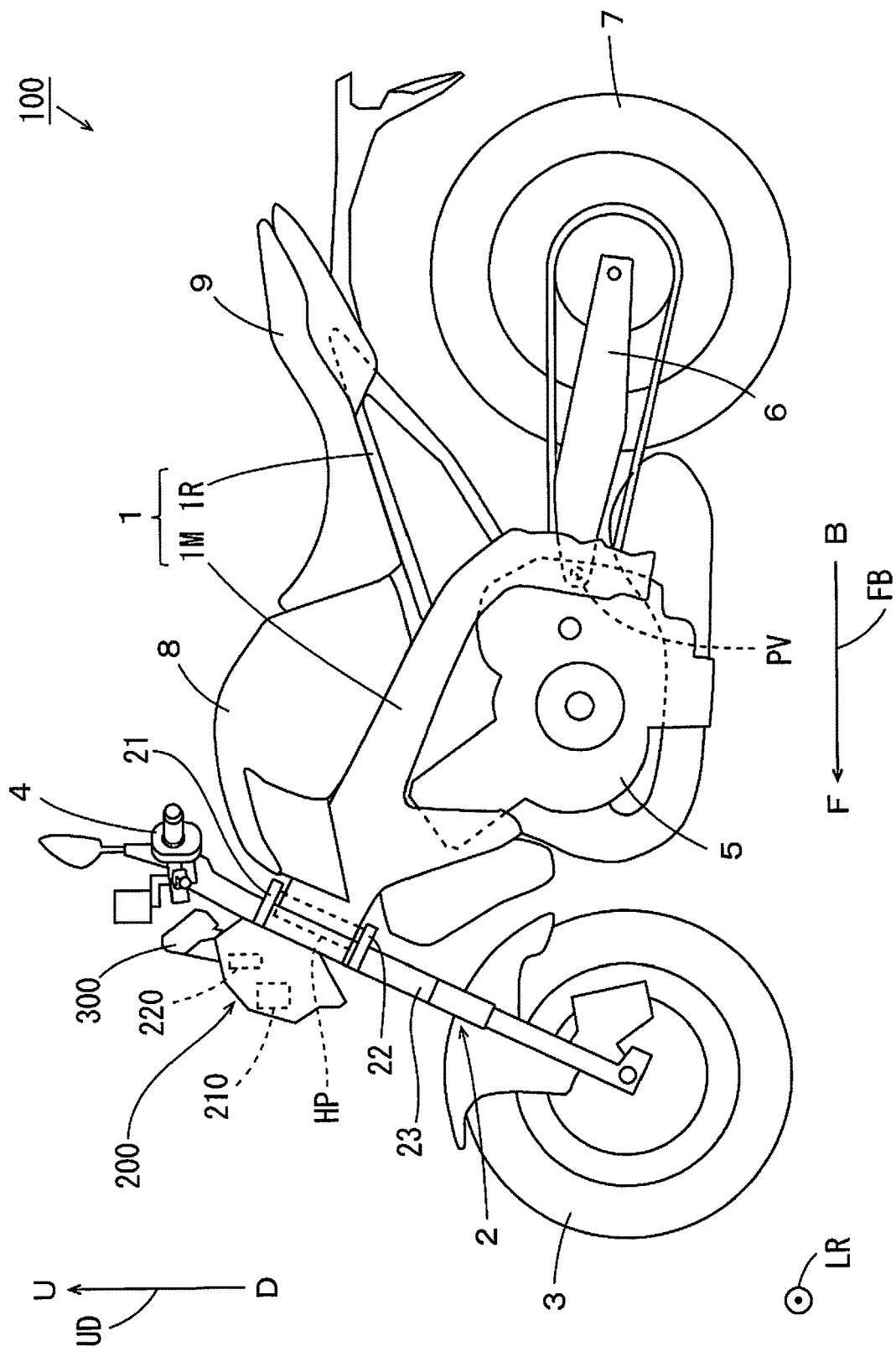
FIG. 1 is a side view of a motorcycle according to one embodiment of the present invention.
Figure 2:
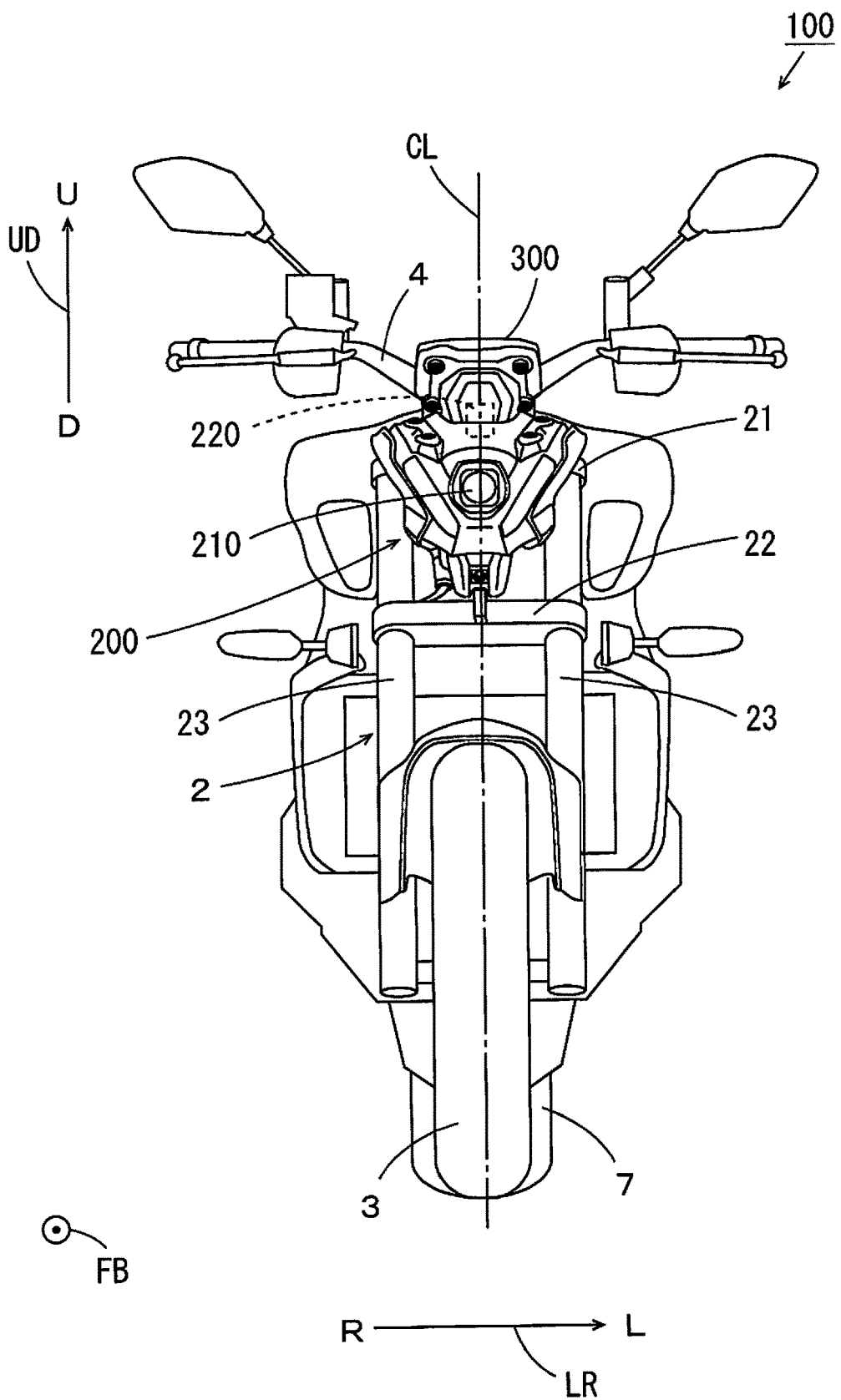
FIG. 2 is a front view of the motorcycle of FIG. 1.

FIG. 1 is a side view of the motorcycle according to the one embodiment of the present invention, and FIG. 2 is a front view of the motorcycle 100 of FIG. 1. In FIGS. 1 and 2, the motorcycle 100 standing up to be perpendicular to the road surface is shown. In each of FIG. 1 and subsequent given diagrams, a front-and-rear direction FB, a left-and-right direction LR and an up-and-down direction UD of the motorcycle 100 are suitably indicated by arrows. The direction in which the arrow is directed in the front-and-rear direction FB is referred to as forward, and its opposite direction is referred to as rearward. Further, the direction in which the arrow is directed in the left-and-right direction LR is referred to as leftward, and its opposite direction is referred to as rightward. Further, the direction in which the arrow is directed in the up-and-down direction UD is referred to as upward, and its opposite direction is referred to as downward. Further, in each of FIG. 1 and subsequent given diagrams, forward, rearward, leftward, rightward, upward and downward are indicated by reference characters F, B, L, R, U and D, respectively.

As shown in FIG. 1, the motorcycle 100 includes a metallic body frame 1. The body frame 1 includes a main frame 1M and a rear frame 1R. The front end of the main frame 1M constitutes a head pipe HP. The main frame 1M is formed to extend rearwardly and downwardly from the head pipe HP. The rear frame 1R is attached to the main frame 1M so as to extend rearwardly and slightly upwardly from the rear end and the vicinity of the rear end of the main frame 1M.

A front fork unit 2 is provided at the head pipe HP to be swingable in the left-and-right direction LR. The front fork unit 2 includes an upper bracket 21, an under bracket 22 and a pair of left and right fork tubes 23. The upper bracket 21 connects the upper ends of the left and right fork tubes 23 to each other. The under bracket 22 connects left and right fork tubes 23 to each other at a position farther downward than the upper bracket 21 by a certain distance. A front wheel 3 is rotatably supported at the lower end of the front fork unit 2. A handle 4 is provided on the upper bracket 21 of the front fork unit 2.

A headlamp unit 200 is provided forwardly of the head pipe HP. The headlamp unit 200 includes a headlamp 210 and a driver unit having a driver circuit (hereinafter, simply referred to as a driver) 220, and is supported by the upper bracket 21 and the under bracket 22. The headlamp 210 includes a light-emitting diode and is configured to be capable of illuminating a road ahead by the light emitted by the light-emitting diode. The driver 220 drives the headlamp 210. Specifically, the driver 220 rectifies an electric current supplied to the light-emitting diode of the headlamp 210. Thus, the light-emitting state of the light-emitting diode is stabilized. As shown in FIG. 2, the headlamp 210 and the driver 220 are provided so as to be located on a center axis CL of the vehicle in the left-and-right direction LR in a front view of the vehicle.

As shown in FIG. 1, a meter unit 300 is provided in an upper portion of the headlamp unit 200. The meter unit 300 displays at least the traveling speed of the vehicle. The details of the configuration of the headlamp unit 200 and its peripheral members will be described below.

The main frame 1M supports an engine 5 at a position farther downward and rearward than the head pipe HP. A fuel tank 8 is provided above the engine 5. A seat 9 is provided rearwardly of the fuel tank 8. The fuel tank 8 is supported by the main frame 1M and located above the main frame 1M. The seat 9 is mainly supported by the rear frame 1R and located above the rear frame 1R.

A rear arm 6 is provided to extend rearwardly from a lower portion at the rear end of the main frame 1M. The rear arm 6 is supported by the main frame 1M via a pivot shaft PV. A rear wheel 7 is rotatably supported at the rear end of the rear arm 6. The rear wheel 7 is rotated by the motive power generated by the engine 5 as a drive wheel.

[2] Configuration of Headlamp Unit 200

Figure 3:
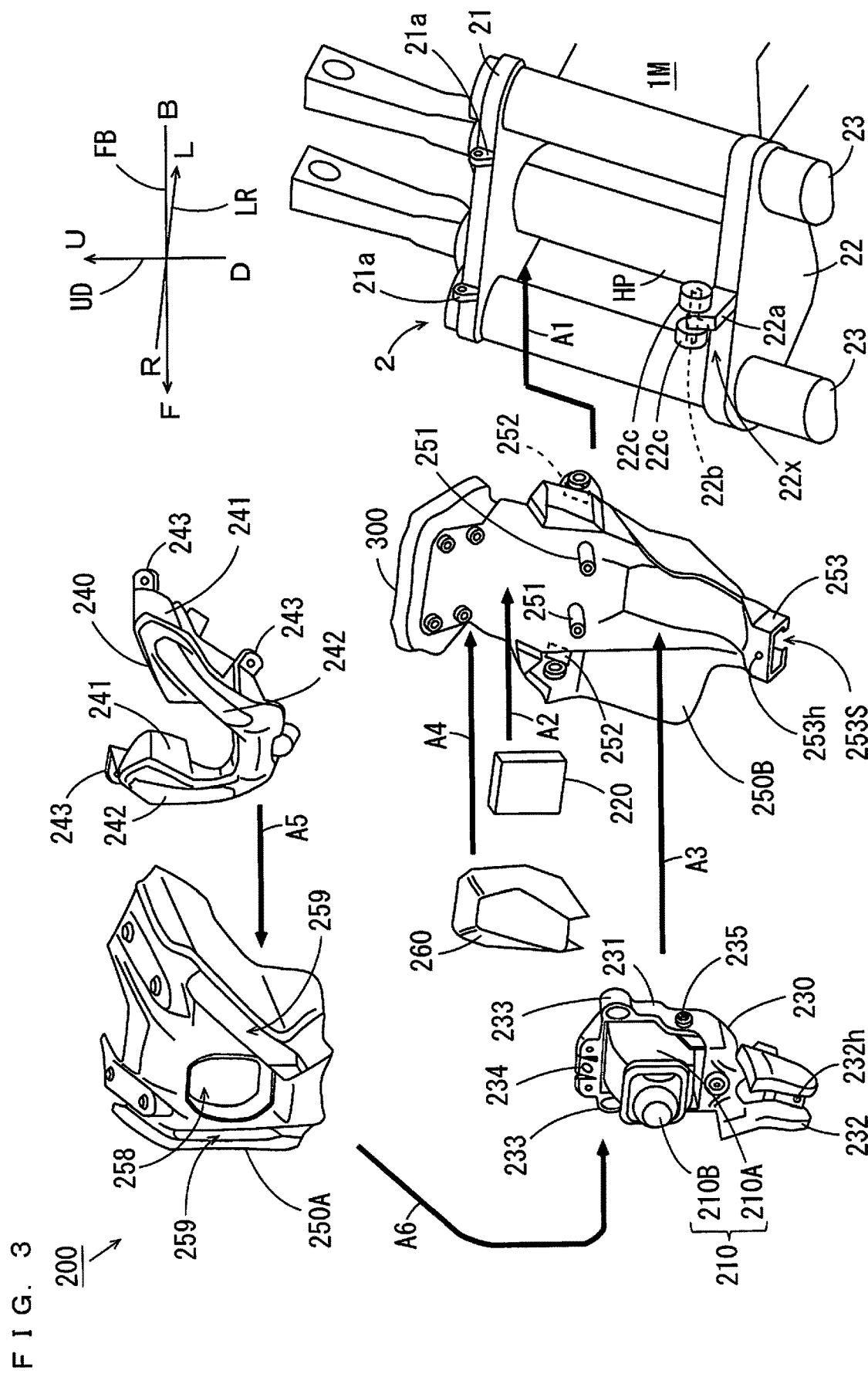
FIG. 3 is an exploded perspective view for explaining the configuration of a headlamp unit of FIG. 1.

FIG. 3 is an exploded perspective view for explaining the configuration of the headlamp unit 200 of FIG. 1. As shown in FIG. 3, the headlamp unit 200 according to the present embodiment is mainly constituted by the headlamp 210, the driver 220, a lamp holder 230, a position lamp 240, a front cover member 250A, a rear cover member 250B and an upper cover member 260.

The plurality of above-mentioned constituent elements are attached to the upper bracket 21 and the under bracket 22 of the front fork unit 2 in order, whereby the headlamp unit 200 is assembled. Therefore, each of the upper bracket 21 and the under bracket 22 has the configuration for supporting the headlamp unit 200.

Specifically, a pair of left and right projections 21a for supporting the upper part of the headlamp unit 200 is provided at the front end of the upper bracket 21 so as to project forwardly of the vehicle. A screw hole penetrating in the left-and-right direction LR is formed in each projection 21a. Further, a support mechanism 22x for supporting the headlamp unit 200 is provided at the center of the front end of the under bracket 22. The support mechanism 22x includes a support member 22a, a shaft member 22b and two grommets 22c. The support member 22a has a bar shape and extends forwardly of the vehicle from the center of the front end of the under bracket 22 by a certain length. The shaft member 22b is attached to the tip of the support member 22a so as to extend in the left-and-right direction LR with the support member 22a located at the center of the shaft member 22b. The two grommets 22c are attached to left and right portions of the shaft member 22b. The details of the configuration of the headlamp unit 200 will be described below together with the steps of assembling the headlamp unit 200.

As indicated by the thick solid arrow A1 in FIG. 3, the rear cover member 250B that is made of resin is first attached to the left and right projections 21a and the support mechanism 22x. The rear cover member 250B has a front surface facing forwardly of the vehicle and a rear surface facing rearwardly of the vehicle. Further, the rear cover member 250B is formed so as to be curved concavely and forwardly of the vehicle and extend in the up-and-down direction UD. The meter unit 300 is attached in advance to the upper end of the rear cover member 250B of the present example.

Two connection shafts 251 are formed at substantially the center of the front surface of the rear cover member 250B so as to project forwardly of the vehicle by a certain length. The two connection shafts 251 are arranged in the left-and-right direction LR while being spaced apart from each other. Further, in the rear cover member 250B, a pair of left and right through holes 252 is formed at the right and left of the two connection shafts 251. The left and right through holes 252 are formed such that the left and right projections 21a of the upper bracket 21 are insertable into the left and right through holes 252 from the rear of the rear cover member 250B.

Further, a connection portion 253 corresponding to the support mechanism 22x provided at the under bracket 22 is formed at the lower end of the rear cover member 250B. Specifically, in the connection portion 253, a storage space 253S into which the two grommets 22c of the support mechanism 22x are insertable from below the rear cover member 250B is formed. Further, the connection portion 253 is configured to be capable of supporting the two grommets 22c that are inserted into the storage space 253S in the storage space 253S. Further, a through hole 253h for connecting the lamp holder 230 mentioned below to the connection portion 253 is formed in the connection portion 253.

When the rear cover member 250B is attached to the front fork unit 2, the two grommets 22c of the support mechanism 22x are inserted into the storage space 253S of the connection portion 253 of the rear cover member 250B to be supported. Further, the left and right projections 21a of the upper bracket 21 are inserted into the left and right through holes 252 of the rear cover member 250B from the rear of the rear cover member 250B. In this state, a bolt is attached to the screw hole of each projection 21a through part of the rear cover member 250B. Thus, the rear cover member 250B is fixed to an upper portion of the front fork unit 2.

Subsequently, as indicated by the thick solid arrow A2 in FIG. 3, the driver 220 is attached to a position slightly farther upward than the center of the rear cover member 250B with a plurality of bolts. The driver 220 of the present example has a flat rectangular box shape.

Figure 4:
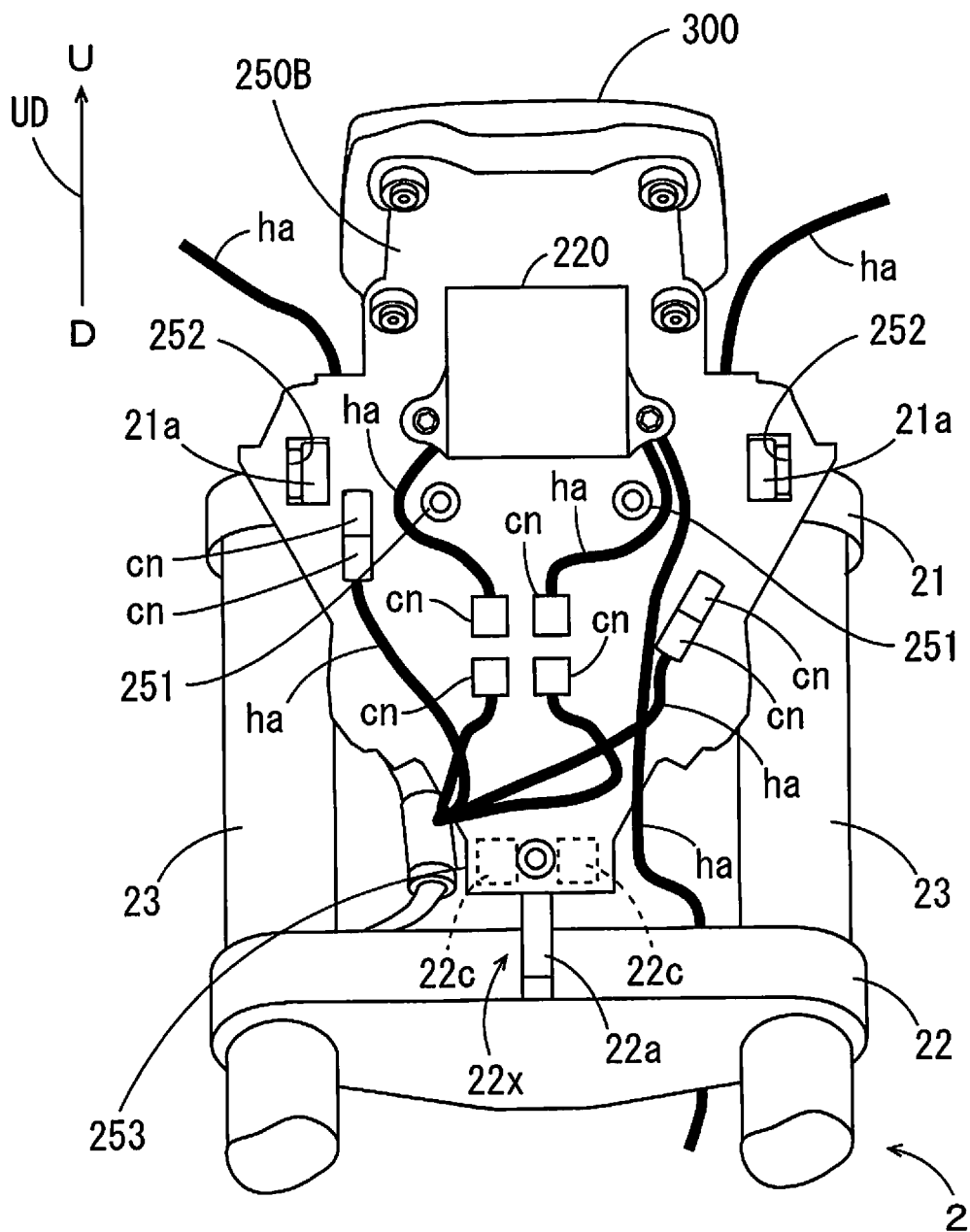
FIG. 4 is a partially enlarged front view of the motorcycle showing one example a rear cover member and a driver being attached to a front fork unit.

FIG. 4 is a partially enlarged front view of the motorcycle 100 showing one example of the rear cover member 250B and the driver 220 being attached to the front fork unit 2. As shown in FIG. 4, a plurality of harnesses ha are arranged on the front surface of the rear cover member 250B with the rear cover member 250B and the driver 220 attached to the front fork unit 2. A connector cn is provided at the end of each of the plurality of harnesses ha. At least one connector cn out of the plurality of connectors provided at the plurality of harnesses ha is connected to the driver 220. At least another connector cn out of the plurality of connectors provided at the plurality of harnesses ha is connected to the headlamp 210 mentioned below.

Next, as indicated by the thick solid arrow A3 in FIG. 3, the lamp holder 230 holding the headlamp 210 is attached to the center of the rear cover member 250B. The lamp holder 230 is mostly formed of resin.

The headlamp 210 includes a light source 210A and a lens 210B. The light source 210A includes the above-mentioned light-emitting diode, a reflector and a heat sink. The lens 210B is attached to the light source 210A such that the light generated by the light-emitting diode, and the light generated by the light-emitting diode and reflected by the reflector are emittable in a light axis direction of the lens 210B.

The lamp holder 230 includes a holder 231, a connection portion 232, two shaft insertion portions 233, a cover fixing portion 234 and an adjustment member 235. The holder 231 is formed to be capable of holding the lens 210B of the headlamp 210. The connection portion 232 is formed to extend downwardly from the holder 231. A through hole 232h corresponding to the through hole 253h formed in the connection portion 253 of the rear cover member 250B is formed in the lower end of the connection portion 232.

The two shaft insertion portions 233 are formed in the portions at the left and right of the holder 231 such that the left and right connection shafts 251 of the rear cover member 250B are insertable into the two shaft insertion portions 233 from the rear of the lamp holder 230. The cover fixing portion 234 is formed at the upper end of the holder 231.

The adjustment member 235 is provided on the side of the holder 231. The adjustment member 235 is a screw for adjusting the light axis of the headlamp 210, and is configured to be capable of changing the position and orientation of the headlamp 210 held by the holder 231. Thus, the traveling direction of the light emitted from headlamp 210 is easily adjustable.

When the headlamp 210 is attached to the rear cover member 250B, the headlamp 210 is first attached to the holder 231 of the lamp holder 230. Next, with the headlamp 210 held by the lamp holder 230, the two connection shafts 251 of the rear cover member 250B are inserted into the left and right shaft insertion portions 233 of the lamp holder 230. Further, the connection portion 232 of the lamp holder 230 is arranged on the connection portion 253 of the rear cover member 250B, and the lamp holder 230 is positioned such that the two through holes 232h and 253h overlap with each other. As such, a bolt is inserted into the through holes 232h, 253h, and a nut is attached to the bolt. Thus, the connection portions 232, 253 are connected to each other. In this manner, the headlamp 210 is fixed on the center portion of the front surface of the rear cover member 250B.

Subsequently, as indicated by the thick solid arrow A4 in FIG. 3, the upper cover member 260 is attached to a position in the vicinity of the upper end of the rear cover member 250B so as to cover the driver 220 from the front. At the time of this attachment, the lower end of the upper cover member 260 and the upper end of the lamp holder 230 are connected to each other with one or a plurality of bolts, for example.

Figure 5:
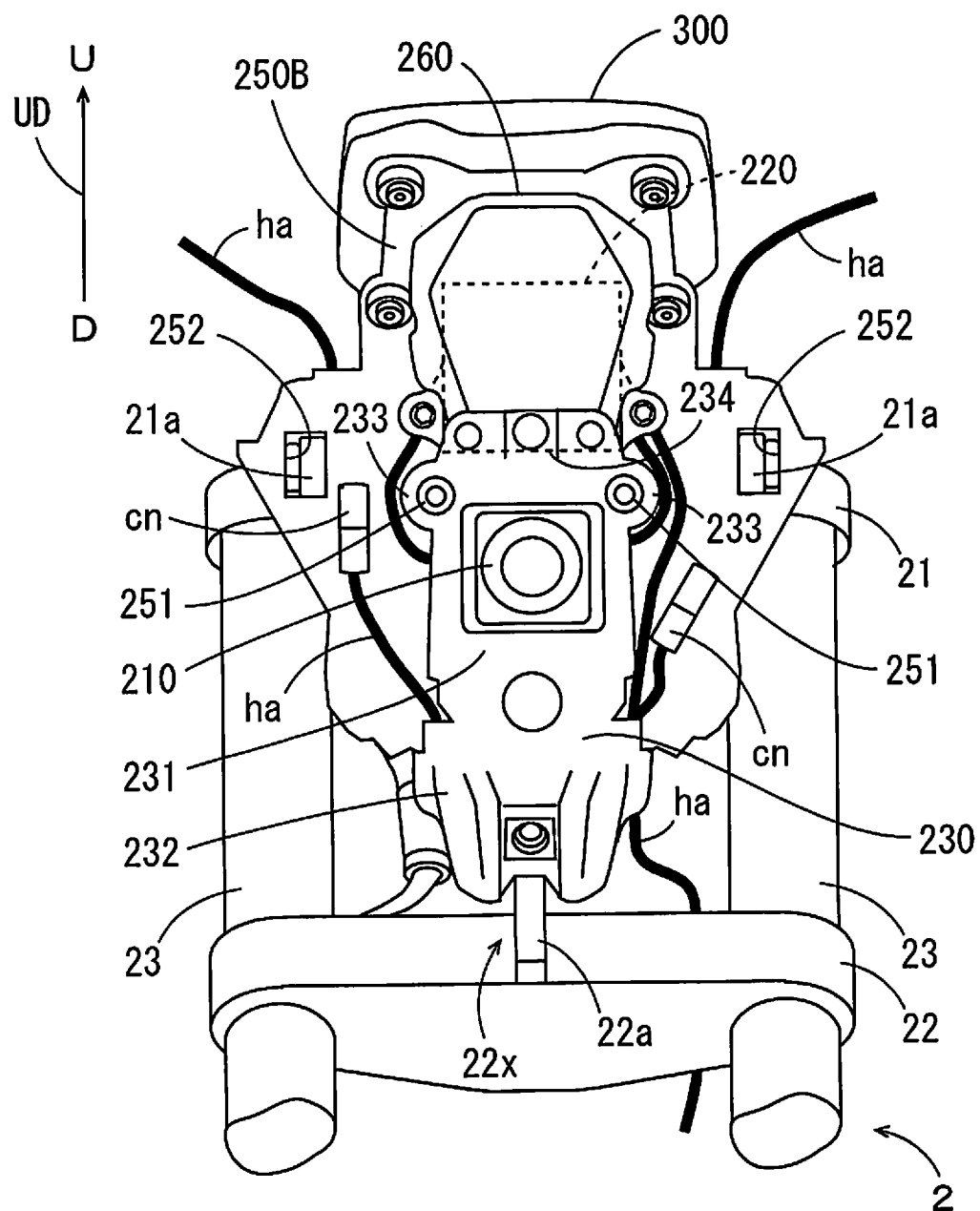
FIG. 5 is a partially enlarged front view of the motorcycle showing one example of a headlamp, a lamp holder and an upper cover member being provided forwardly of the rear cover member of FIG. 4.

FIG. 5 is a partially enlarged front view of the motorcycle 100 showing one example of the headlamp 210, the lamp holder 230 and the upper cover member 260 being provided forwardly of the rear cover member 250B of FIG. 4. Any of the plurality of harnesses ha of FIG. 4 is connected to the headlamp 210 with the headlamp 210 and the lamp holder 230 provided forwardly of the rear cover member 250B. The headlamp 210 is located at substantially the center of the rear cover member 250B in the front view of the vehicle. The driver 220 is located above the headlamp 210 in the front view of the vehicle.

Next, as indicated by the thick solid arrow A5 in FIG. 3, the position lamp 240 is attached to the front cover member 250A that is formed of resin from the rear of the front cover member 250A. The position lamp 240 includes a pair of left and right light sources 241, a pair of left and right lenses 242 and a plurality of connection portions 243, and substantially has a V-shape when seen in a front view. Each light source 241 includes a light-emitting diode, a reflector and a heat sink. Each lens 242 is attached to the corresponding light source 241 such that the light generated by the light-emitting diode, and the light generated by the light-emitting diode and reflected by the reflector are emittable in a light axis direction of the lens 242. The plurality of connection portions 243 are formed so as to project rightwardly or leftwardly from a plurality of portions of the left and right light sources 241.

The front cover member 250A has a front surface facing forwardly of the vehicle and a rear surface facing rearwardly of the vehicle, and is convexly curved so as to bulge fowardly of the vehicle. A headlamp opening 258 is formed in the center portion of the front cover member 250A. The headlamp opening 258 is formed such that the lens 210B of the headlamp 210 is insertable into the headlamp opening 258 from the rear of the vehicle. Further, a pair of left and right position lamp openings 259 are formed in the portions at the right and left of the headlamp opening 258. The position lamp openings 259 are formed such that the left and right lenses 242 of the position lamp 240 are insertable into the position lamp openings 259 from the rear of the front cover member 250A.

When the position lamp 240 is attached to the front cover member 250A, the left and right lenses 242 of the position lamp 240 are inserted into the left and right position lamp openings 259 of the front cover member 250A. In this state, the plurality of connection portions 243 of the position lamp 240 are connected to the rear surface of the front cover member 250A with bolts.

Thereafter, as indicated by the thick solid arrow A6 in FIG. 3, the front cover member 250A is attached to the rear cover member 250B from the front of the rear cover member 250B. Here, a connection projection (not shown) that are connectable to the cover fixing portion 234 of the lamp holder 230 is formed in an upper portion of the rear surface of the front cover member 250A. Thus, when the front cover member 250A is attached to the rear cover member 250B, the connection projection of the front cover member 250A is connected to the cover fixing portion 234 of the lamp holder 230. Further, the lens 210B of the headlamp 210 is inserted into the headlamp opening 258 of the front cover member 250A.

Figure 6:
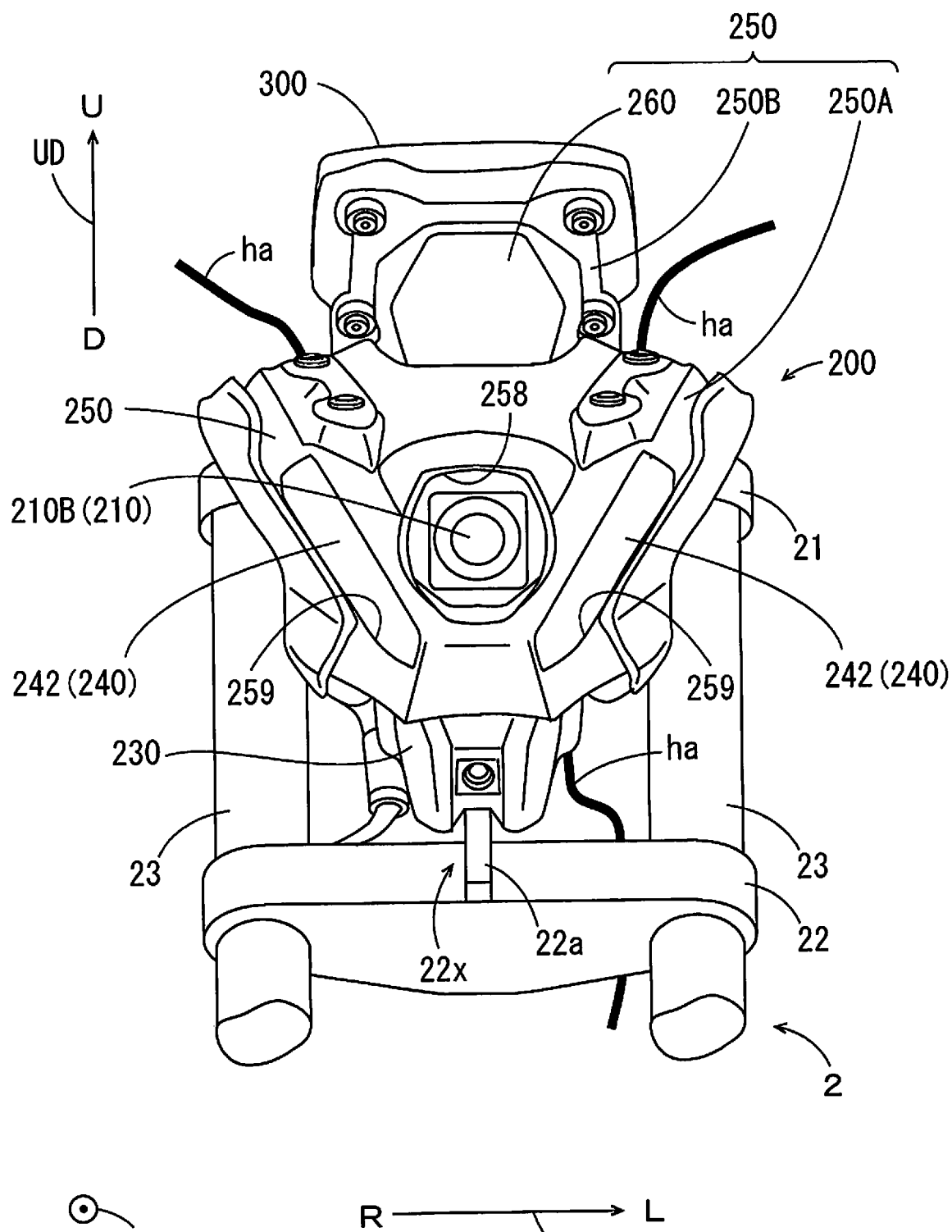
FIG. 6 is a partially enlarged front view of the motorcycle showing one example of a front cover member being provided forwardly of the rear cover member of FIG. 4.

FIG. 6 is a partially enlarged front view of the motorcycle 100 showing one example of the front cover member 250A being provided forwardly of the rear cover member 250B of FIG. 4. As shown in FIG. 6, with the front cover member 250A provided forwardly of the rear cover member 250B, the front cover 250 having the front cover member 250A, the rear cover member 250B and the upper cover member 260 is completed.

In the front cover 250, part of the headlamp 210 except for the lens 210B, part of the position lamp 240 except for the lens 242, the driver 220, the lamp holder 230, part of the plurality of harnesses ha and the plurality of connectors cn are stored. This prevents vandalism of the headlamp 210, the position lamp 240, the driver 220 and the lamp holder 230 by vandals. Further, this prevents vandalism of the plurality of harnesses ha and the plurality of connectors cn by vandals. Further, each constituent element stored in the front cover 250 is protected from rainwater, dust and so on.

[3] Arrangement and Effects of Each Constituent Element in Headlamp Unit 200

Figure 7:
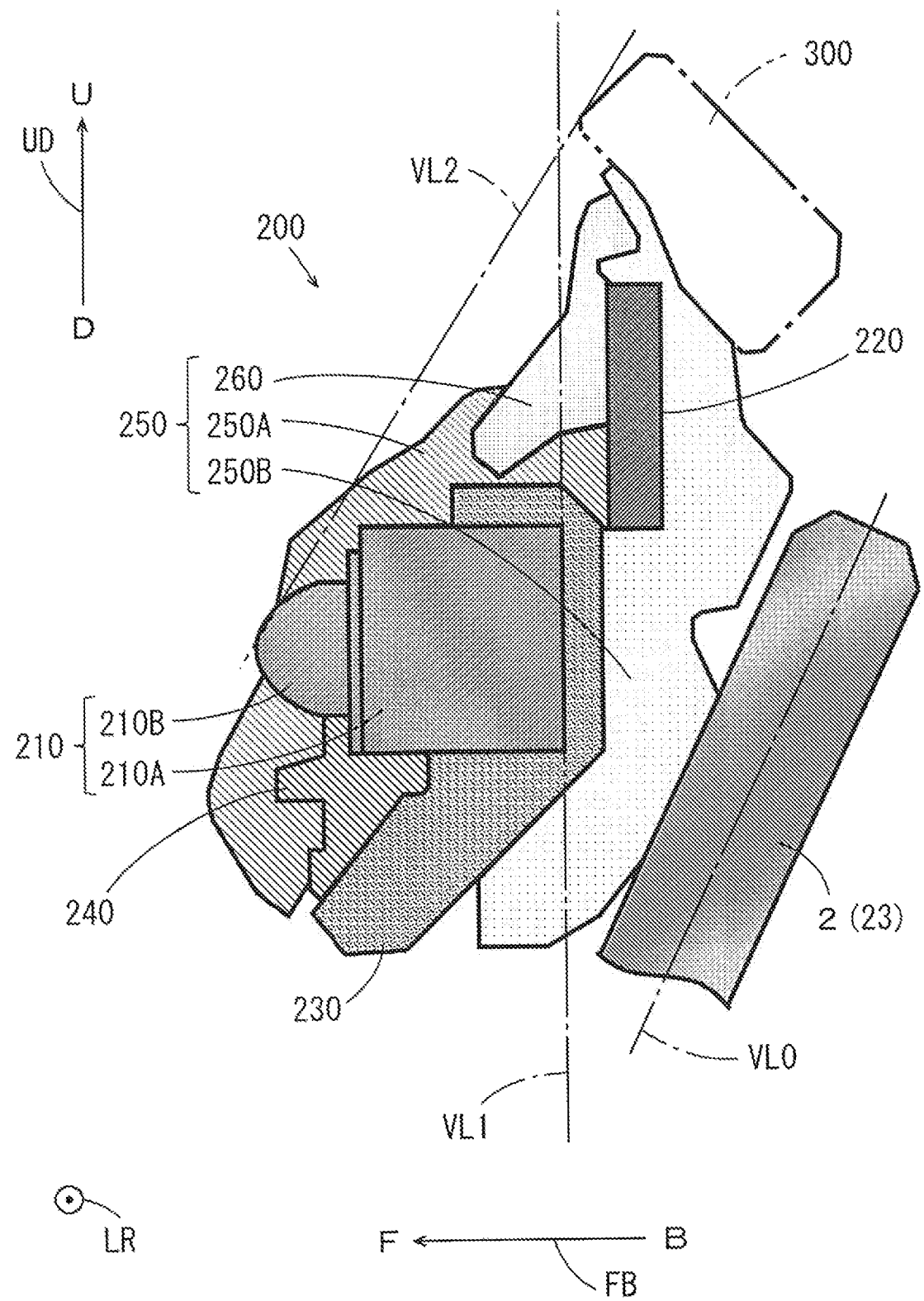
FIG. 7 is a schematic cross sectional view for explaining the effects based on a positional relationship among a plurality of constituent elements in the headlamp unit of FIG. 1.

(a) FIG. 7 is a schematic cross sectional view for explaining the effects based on the positional relationship among the plurality of constituent elements in the headlamp unit 200 of FIG. 1. In FIG. 7, a cross section of the headlamp unit 200 cut along a vertical plane extending in the front-and-rear direction FB through a center axis CL of FIG. 2 is shown. In order to facilitate understanding of the positional relationship among the constituent elements, different types of hatching and dot patterns are applied to the plurality of constituent elements in the cross section of FIG. 7. Further, the meter unit 300 provided on the headlamp unit 200 is indicated by a one-dot and dash line in FIG. 7.

(b) As shown in FIG. 7, the rear cover member 250B is attached to the front fork unit 2 so as to be located forwardly of the front fork unit 2 in the headlamp unit 200. The lamp holder 230 is attached to a portion extending from the center portion to the lower end of the front surface of the rear cover member 250B. The lamp holder 230 holds the headlamp 210.

The driver 220 is attached to the front surface of the rear cover member 250B separately from the lamp holder 230 such that the driver 220 is mostly located at a position farther upward than the headlamp 210. Further, the driver 220 is located at a position farther rearward than a first virtual line VL1 extending in the up-and-down direction UD through the rear end of the headlamp 210 in the side view of the vehicle. Further, the driver 220 is located at a position farther rearward than a second virtual line VL2 extending along an axis (an axis of the fork tube 23) VL0 of the front fork unit 2 in the side view of the vehicle.

Here, the second virtual line VL2 may be more specifically defined as a straight line extending through the front end of the headlamp 210 and the front end of the meter unit 300 in the side view of the vehicle. Alternatively, the second virtual line VL2 may be defined as a straight line that extends in parallel with the axis VL0 of the front fork unit 2 through the front end of the headlamp 210 in the side view of the vehicle.

The front fork unit 2 is inclined with respect to the vertical axis extending in the up-and-down direction UD, and extends rearwardly and upwardly. In this case, in the front part of the motorcycle 100, the space located at a position farther rearward than the first virtual line VL1, farther rearward than the second virtual line VL2 and farther upward than the front fork unit 2 is a dead space.

With the above-mentioned configuration, the driver 220 is located in the dead space in the front part of the vehicle. In this manner, the dead space in the front part of the vehicle is effectively utilized as an installation space for the driver 220. Thus, even in a case where the driver 220 is arranged to be spaced apart from the headlamp 210 by a predetermined distance, an increase in size of the front part of the vehicle due to ensuring the installation space for the driver 220 is suppressed.

As a result, it is possible to reduce heat transmitted from the headlamp 210 to the driver 220 while suppressing an increase in size of the front part of the motorcycle 100.

(c) The meter unit 300 is supported by the rear cover member 250B so as to be located at a position farther upward than the headlamp 210 and farther rearward than the first virtual line VL1 in the side view of the vehicle. In this case, the meter unit 300 is arranged in the dead space at a position farther rearward and upward than the headlamp 210. In this manner, the dead space in the front part of the vehicle is further effectively utilized as an installation space for the meter unit 300. This suppresses an increase in size of the front part of the vehicle due to ensuring the installation space for the meter unit 300.

(d) In the above-mentioned headlamp unit 200, at least part of the lamp holder 230 is formed of resin. In this case, the heat transmitted from the headlamp 210 to the front cover 250 can be reduced as compared to the case where the entire lamp holder 230 is formed of metal. Therefore, the heat transmitted from the headlamp 210 to the driver 220 via the lamp holder 230 and the front cover 250 can be reduced.

(e) In the motorcycle 100 according to the present embodiment, the headlamp 210 and driver 220 are located on a center axis CL of the vehicle in the left-and-right direction LR in the front view of the vehicle as shown in FIG. 2. With such a configuration, because the headlamp 210 is arranged at the center of the vehicle in the left-and-right direction LR, the flexibility in layout of vehicle components in the front part of the vehicle can be improved while an increase in size of the front part of the vehicle in the left-and-right direction LR is suppressed.

[4] Other Embodiments (a) In the headlamp unit 200 according to the above-mentioned embodiment, the upper cover member 260 and the front cover member 250A out of the plurality of members that constitute the front cover 250 may be constituted integrally by a single member. In this case, the number of components constituting the front part of the vehicle can be reduced.

(b) While the entire driver 220 is located at a position farther rearward than the first virtual line VL1 in the above-mentioned embodiment, the present invention is not limited to this. One part of the driver 220 may be located at a position farther rearward than the first virtual line VL1, and the rest of the driver 220 does not have to be located at the position farther rearward than the first virtual line VL1. Also in this case, the dead space in the front part of the vehicle is effectively utilized as part of the installation space for the driver 220, so that an increase in size of the front part of the vehicle is suppressed.

(c) While the entire driver 220 is located at a position farther rearward than the second virtual line VL2 in the headlamp unit 200 according to the above-mentioned embodiment, the present invention is not limited to this. One part of the driver 220 may be located at a position farther rearward than the second virtual line VL2, and the rest of the driver 220 does not have to be located at the position farther rearward than the second virtual line VL2. Also in this case, the dead space in the front part of the vehicle is effectively utilized as part of the installation space for the driver 220, so that an increase in size of the front part of the vehicle is suppressed.

(d) While part of the driver 220 is arranged at a position farther upward than the headlamp 210 in the headlamp unit 200 according to the above-mentioned embodiment, the present invention is not limited to this.

Figure 8:
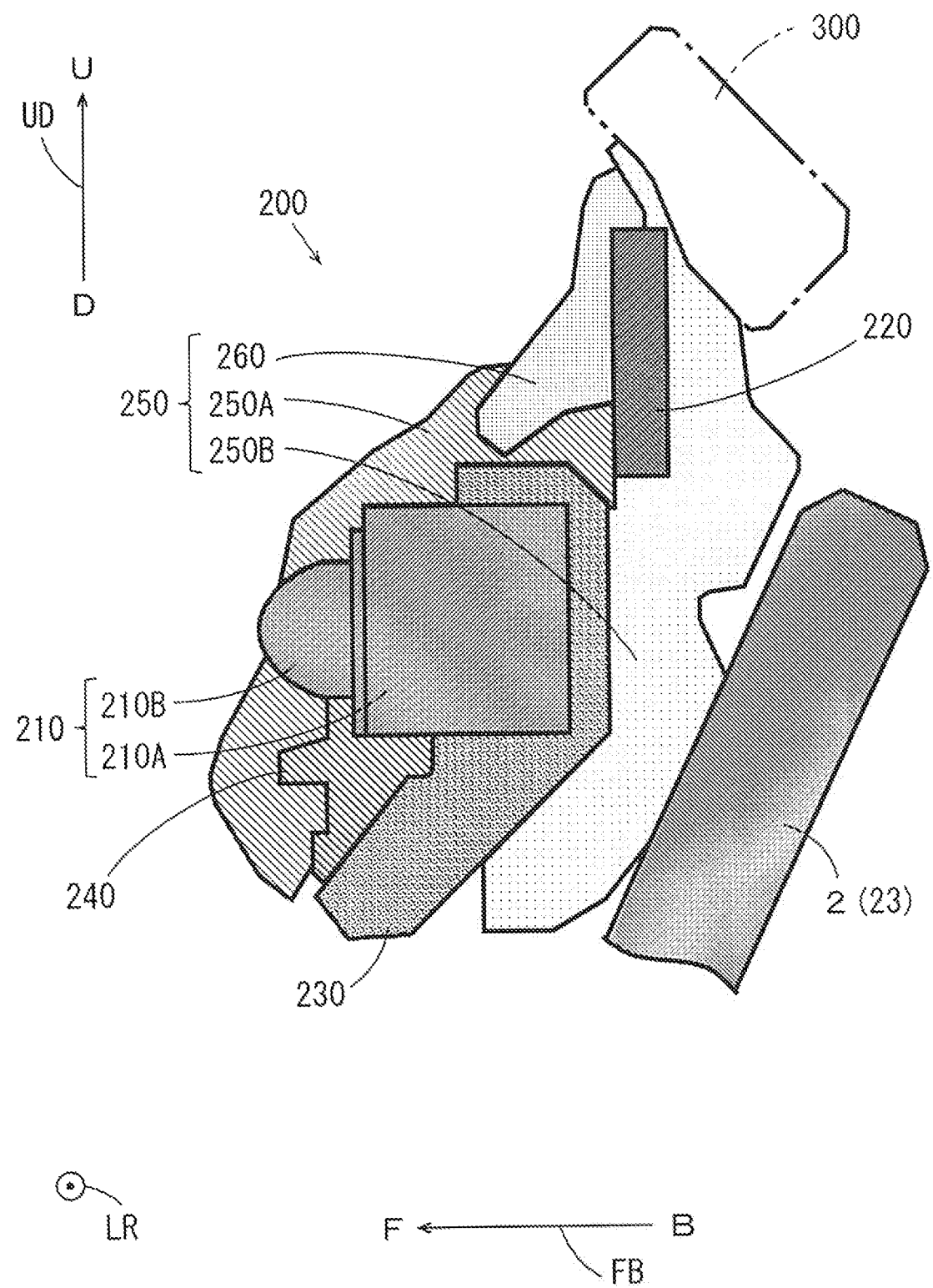
FIG. 8 is a schematic cross sectional view showing one example of the inner configuration of the headlamp unit according to another embodiment.

FIG. 8 is a schematic cross sectional view showing one example of the inner configuration of the headlamp unit 200 according to another embodiment. The schematic sectional view of FIG. 8 corresponds to the schematic cross sectional view of FIG. 7. As shown in FIG. 8, the entire driver 220 may be arranged at a position farther upward than the headlamp 210 in the headlamp unit 200. In this case, the layout of the driver 220 is not restricted by the headlamp 210 as compared to the case where the driver 220 is arranged at a position farther forward, rearward, leftward or rightward than the headlamp 210. Therefore, flexibility in layout of the driver 220 is improved, so that the degree of flexibility in design of the front part of the vehicle is improved.

(e) While the adjustment member 235 for adjusting the traveling direction of the light emitted from the headlamp 210 is provided in the lamp holder 230 in the headlamp unit 200 according to the above-mentioned embodiment, the present invention is not limited to this. The adjustment member 235 does not have to be provided in the headlamp unit 200.

(f) While one headlamp 210 is provided at the rear cover member 250B in the headlamp unit 200 according to the above-mentioned embodiment, the present invention is not limited to this. For example, two headlamps 210 respectively held by the two lamp holders 230 may be provided at the rear cover member 250B so as to be arranged in the left-and-right direction. In this case, each headlamp 210 and the driver 220 corresponding to the headlamp 210 have the positional relationship similar to that of the above-mentioned embodiment, whereby the similar working effects to that of the above-mentioned embodiment can be acquired.

(g) While the above-mentioned embodiment is an example in which the present invention is applied to the motorcycle, the present invention is not limited to this. The present invention may be applied to another straddled vehicle such as a four-wheeled automobile, a motor tricycle or an ATV (All Terrain Vehicle).

[5] Correspondences Between Constituent Elements in Claims and Parts in Preferred Embodiments In the following paragraphs, non-limiting examples of correspondences between various elements recited in the claims below and those described above with respect to various preferred embodiments of the present invention are explained.

In the above-mentioned embodiment, the front fork unit 2 is an example of a front fork unit, the front cover 250 is an example of a front cover, the headlamp 210 is an example of a headlamp, the lamp holder 230 is an example of a holder, the driver 220 is an example of a driver, the rear cover member 250B is an example of a rear cover member and the front cover member 250A is an example of a front cover member.

Further, the first virtual line VL1 is an example of a first virtual line, the second virtual line VL2 is an example of a second virtual line, the axis VL0 of the front fork unit 2 is an example of an axis of a front fork unit, the plurality of harnesses ha are an example of a plurality of harnesses, the connector cn is an example of a connector, the meter unit 300 is an example of a meter, the lens 210B of the headlamp 210 is an example of an optical system and the adjustment member 235 is an example of an optical system operation element.

As each of constituent elements recited in the claims, various other elements having configurations or functions described in the claims can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A straddled vehicle, comprising:
a front fork unit that is provided to be inclined rearwardly;
a front cover that is provided forwardly of the front fork unit, the front cover having a rear cover member, and a front cover member separately provided from the rear cover member, the front cover member being provided forwardly of the rear cover member, the rear cover member being attached to the front fork unit and being at a position farther forward than the front fork unit;
a headlamp that includes a light-emitting diode that emits light, and is provided at the front cover;
a holder that is attached to the rear cover member of the front cover, and holds the headlamp;
a meter unit that displays a traveling speed of the vehicle, in a front-to-rear direction of the vehicle, the meter unit being located at a position farther upward than the headlamp and farther rearward than a first virtual line that extends in an up-and-down direction through a rear end of the headlamp and a second virtual line that extends through a front end of the headlamp and a front end of the meter unit; and
a driver that drives the headlamp, the driver being stored in the front cover such that
at least a part of the driver is located at a position farther upward than the headlamp,
at least a part of the driver is located at a position farther rearward than the first virtual line in the front-to-rear direction of the vehicle, and
the driver is located at a position farther rearward than the second virtual line in the front-to-rear direction of the vehicle.

2. The straddled vehicle according to claim 1, wherein the driver rectifies an electric current supplied to the light-emitting diode.

3. The straddled vehicle according to claim 1, further comprising:
a plurality of harnesses that include at least two harnesses respectively connected to the headlamp and the driver; and
a connector for connecting one of the plurality of harnesses to another one of the plurality of harnesses, wherein
the connector and at least a part of one of the plurality of harnesses are stored in the front cover.

4. The straddled vehicle according to claim 1, wherein the headlamp and the driver are provided to be located at a center of the vehicle in a left-and-right direction in a front view of the vehicle.

5. The straddled vehicle according to claim 1, wherein
the headlamp further includes an optical system that leads the light emitted by the light-emitting diode forwardly of the vehicle, and
the holder includes an optical system operating element for adjusting a traveling direction of the light from the headlamp by changing a position or an orientation of the optical system.

6. The straddled vehicle according to claim 1, wherein at least a part of the holder is made of resin.

7. The straddled vehicle according to claim 1, wherein the driver is stored in the front cover to be entirely located at a position farther upward than the headlamp.

8. The straddled vehicle according to claim 1, wherein the second virtual line extends in parallel with an axis of the front fork unit.

* * * * *